US012634114B2

(12) United States Patent　(10) Patent No.:　US 12,634,114 B2
Singh et al.　(45) Date of Patent:　May 19, 2026

(54) RECURRENT NEURAL NETWORK-BASED USER IDENTITY MISAPPROPRIATION PREVENTION FROM PUBLIC DOMAINS AND CONNECTIONS

(71) Applicant: BANK OF AMERICA CORPORATION, Charlotte, NC (US)

(72) Inventors: Shailendra Singh, Maharashtra (IN); Saurabh Gupta, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 62 days.

(21) Appl. No.: 18/627,961

(22) Filed: Apr. 5, 2024

(65) Prior Publication Data

US 2025/0317272 A1　Oct. 9, 2025

(51) Int. Cl.
　　*H04L 9/00*　　　(2022.01)
　　*G06N 3/044*　　　(2023.01)
(52) U.S. Cl.
　　CPC ............. *H04L 9/008* (2013.01); *G06N 3/044* (2023.01)
(58) Field of Classification Search
　　CPC ................................ H04L 9/008; G06N 3/044
　　See application file for complete search history.

(56) References Cited

U.S. PATENT DOCUMENTS

| | | | |
|---|---|---|---|
| 6,038,333 A | 3/2000 | Wang | |
| 6,118,485 A | 9/2000 | Hinoue et al. | |
| 6,137,685 A | 10/2000 | Morinaga | |
| 6,256,063 B1 | 7/2001 | Saito et al. | |
| 6,385,318 B1 | 5/2002 | Oishi | |
| 7,039,221 B1 | 5/2006 | Tumey et al. | |
| 9,060,012 B2 | 6/2015 | Eisen | |
| 9,098,617 B1 | 8/2015 | Pauley, Jr. et al. | |
| 9,112,850 B1 | 8/2015 | Eisen | |
| 9,118,646 B2 | 8/2015 | Pierson et al. | |
| 9,196,004 B2 | 11/2015 | Eisen | |
| 9,361,597 B2 | 6/2016 | Britton et al. | |
| 9,390,384 B2 | 7/2016 | Eisen | |
| 9,396,331 B2 | 7/2016 | Eisen et al. | |
| 9,412,123 B2 | 8/2016 | Eisen | |
| 9,754,311 B2 | 9/2017 | Eisen | |
| 11,188,930 B2 * | 11/2021 | Chandra Sekar Rao .................... G06Q 30/0202 | |
| 2018/0212756 A1 * | 7/2018 | Carr ........................ H04L 9/008 | |
| 2020/0327444 A1 * | 10/2020 | Negi ................. G06Q 30/0281 | |

* cited by examiner

*Primary Examiner* — Carl G Colin
(74) *Attorney, Agent, or Firm* — Moore & Van Allen PLLC; Nicholas C. Russell

(57)　　　　　　ABSTRACT

Web browsing security is realized through use of a recurrent neural network (RNN) capable of creating a plurality of layers comprising web browser session wrappers, which overlay the actual user session. In this regard, the RNN creates hidden layer(s) and a final layer overlaying the last hidden layer which is exposed to the website and or domain. The RNN implements homomorphic encryption to systematically encrypt the session data and/or user data associated with the actual user session and stored or accessible to the various session wrappers. Once unauthorized use/tampering is detecting in the final layer, the RNN can reconfigure/add to the existing hidden layers and/or the homomorphic encryption can re-encrypt the session/user data is each layer/session wrapper.

20 Claims, 6 Drawing Sheets

Figure 2:
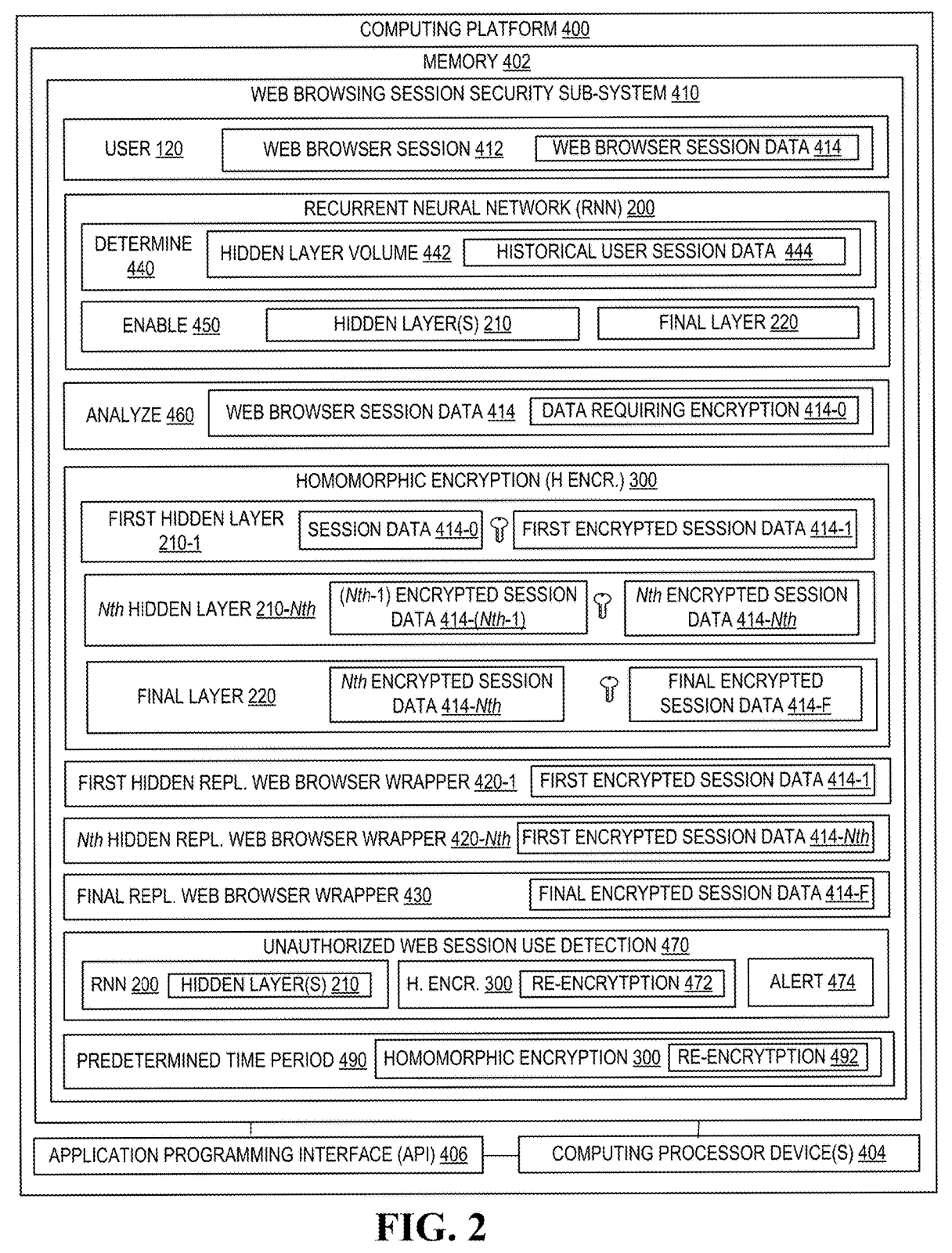

COMPUTING PLATFORM 400

MEMORY 402

WEB BROWSING SESSION SECURITY SUB-SYSTEM 410

USER 120 | WEB BROWSER SESSION 412 | WEB BROWSER SESSION DATA 414

RECURRENT NEURAL NETWORK (RNN) 200

DETERMINE 440 | HIDDEN LAYER VOLUME 442 | HISTORICAL USER SESSION DATA 444

ENABLE 450 | HIDDEN LAYER(S) 210 | FINAL LAYER 220

ANALYZE 460 | WEB BROWSER SESSION DATA 414 | DATA REQUIRING ENCRYPTION 414-0

HOMOMORPHIC ENCRYPTION (H ENCR.) 300

FIRST HIDDEN LAYER 210-1 | SESSION DATA 414-0 | FIRST ENCRYPTED SESSION DATA 414-1

Nth HIDDEN LAYER 210-Nth | (Nth-1) ENCRYPTED SESSION DATA 414-(Nth-1) | Nth ENCRYPTED SESSION DATA 414-Nth

FINAL LAYER 220 | Nth ENCRYPTED SESSION DATA 414-Nth | FINAL ENCRYPTED SESSION DATA 414-F

FIRST HIDDEN REPL. WEB BROWSER WRAPPER 420-1 | FIRST ENCRYPTED SESSION DATA 414-1

Nth HIDDEN REPL. WEB BROWSER WRAPPER 420-Nth | FIRST ENCRYPTED SESSION DATA 414-Nth

FINAL REPL. WEB BROWSER WRAPPER 430 | FINAL ENCRYPTED SESSION DATA 414-F

UNAUTHORIZED WEB SESSION USE DETECTION 470

RNN 200 | HIDDEN LAYER(S) 210 | H. ENCR. 300 | RE-ENCRYPTION 472 | ALERT 474

PREDETERMINED TIME PERIOD 490 | HOMOMORPHIC ENCRYPTION 300 | RE-ENCRYPTION 492

APPLICATION PROGRAMMING INTERFACE (API) 406 | COMPUTING PROCESSOR DEVICE(S) 404

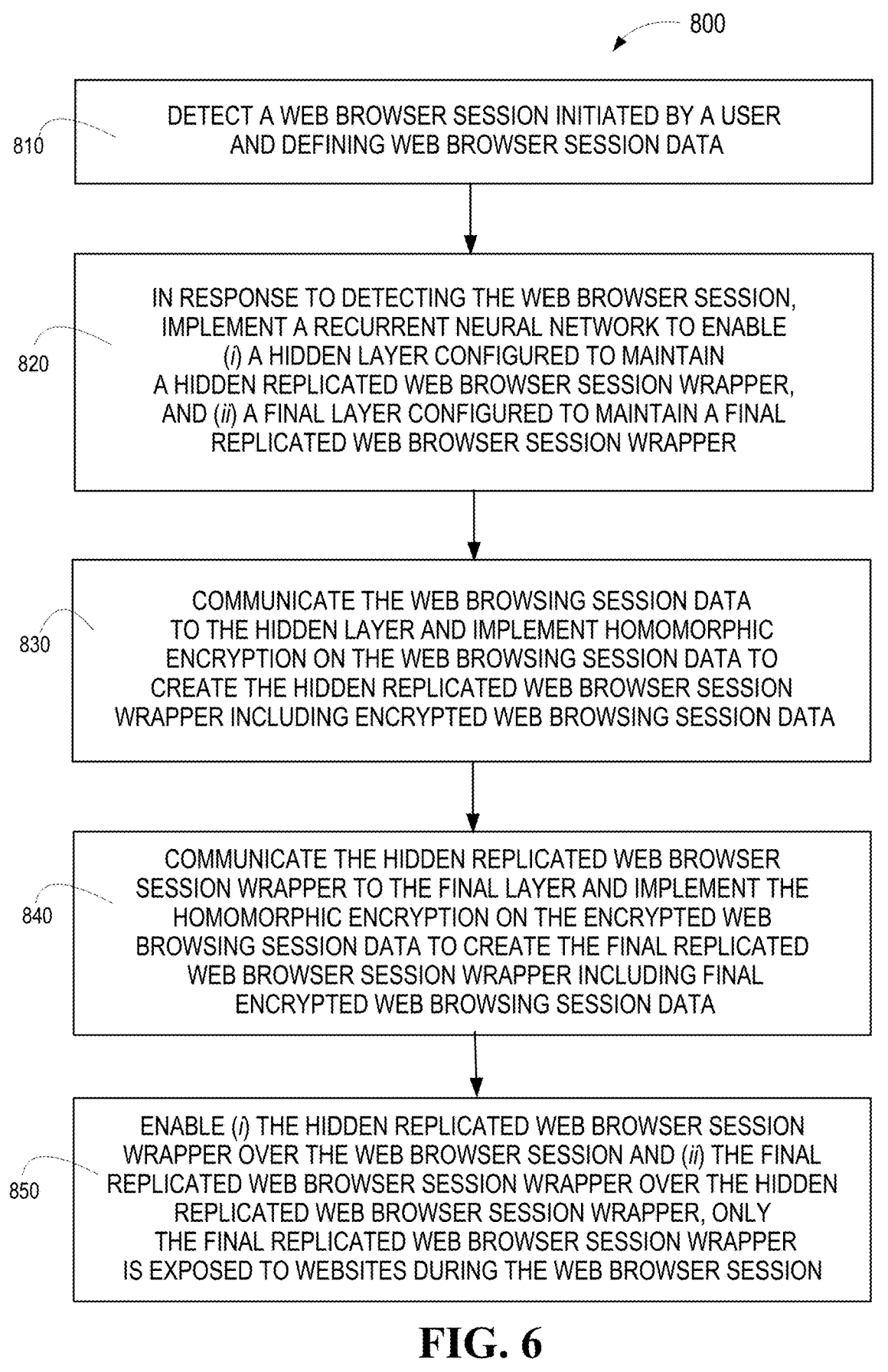

810 — DETECT A WEB BROWSER SESSION INITIATED BY A USER AND DEFINING WEB BROWSER SESSION DATA

820 — IN RESPONSE TO DETECTING THE WEB BROWSER SESSION, IMPLEMENT A RECURRENT NEURAL NETWORK TO ENABLE (*i*) A HIDDEN LAYER CONFIGURED TO MAINTAIN A HIDDEN REPLICATED WEB BROWSER SESSION WRAPPER, AND (*ii*) A FINAL LAYER CONFIGURED TO MAINTAIN A FINAL REPLICATED WEB BROWSER SESSION WRAPPER

830 — COMMUNICATE THE WEB BROWSING SESSION DATA TO THE HIDDEN LAYER AND IMPLEMENT HOMOMORPHIC ENCRYPTION ON THE WEB BROWSING SESSION DATA TO CREATE THE HIDDEN REPLICATED WEB BROWSER SESSION WRAPPER INCLUDING ENCRYPTED WEB BROWSING SESSION DATA

840 — COMMUNICATE THE HIDDEN REPLICATED WEB BROWSER SESSION WRAPPER TO THE FINAL LAYER AND IMPLEMENT THE HOMOMORPHIC ENCRYPTION ON THE ENCRYPTED WEB BROWSING SESSION DATA TO CREATE THE FINAL REPLICATED WEB BROWSER SESSION WRAPPER INCLUDING FINAL ENCRYPTED WEB BROWSING SESSION DATA

850 — ENABLE (*i*) THE HIDDEN REPLICATED WEB BROWSER SESSION WRAPPER OVER THE WEB BROWSER SESSION AND (*ii*) THE FINAL REPLICATED WEB BROWSER SESSION WRAPPER OVER THE HIDDEN REPLICATED WEB BROWSER SESSION WRAPPER, ONLY THE FINAL REPLICATED WEB BROWSER SESSION WRAPPER IS EXPOSED TO WEBSITES DURING THE WEB BROWSER SESSION

FIG. 6

RECURRENT NEURAL NETWORK-BASED USER IDENTITY MISAPPROPRIATION PREVENTION FROM PUBLIC DOMAINS AND CONNECTIONS

FIELD OF THE INVENTION

The present invention is generally directed to computer network security and, more specifically, implementing a Recurrent Neural Network and homomorphic encryption to prevent user identity misappropriation and other wrongdoings within the Internet, especially when users are accessing the Internet via public domains/connections.

BACKGROUND

Internet security is of paramount importance in order to ensure that users' identities are not compromised and/or protect against of other wrongful activities. In this regard, bad actors/wrongdoers target and gain access to user web browsing sessions and gain an understanding of how the user web browsing session was created and intercept the session identifier and the identity of the user including user login credentials and the like. Subsequently, the bad actor/wrongdoer uses the user's identity/credentials and the session-related details to mimic the identity of the user and conduct unauthorized/wrongful activities.

Such unauthorized/wrongful activities are especially prevalent when users are connecting to the Internet via public domains (e.g., public Wi-Fi or the like) that allow users to gain access without requiring specific permissions and/or user credentials. While public domain networks provide convenient access to the Internet, they pose significant security perils, in that, public domain networks are typically unsecured and, thus, prone to unauthorized access and/or interception of data.

Therefore, a need exists to develop systems, methods, computer program products and the like that provide computer network security, specifically, provide protection against wrongful and unauthorized access to a user's web browser session. In this regard, the desired systems, methods, computer product and the like should address challenges associated with user sensitive/personal data misappropriation, including user identity and/or wrongful/illicit activities resulting from unauthorized access to a public website and/or from a public domain.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a recurrent neural network (RNN) capable of creating a plurality of layers comprising web browser session wrappers, which overlay the actual user session. In this regard, the RNN creates at least one, and typically more, hidden layer(s) and a so-called final layer overlaying the last hidden layer which is exposed to the website and or domain. Moreover, the RNN implements homomorphic encryption to systematically encrypt the session data and/or user data associated with the actual user session.

Specifically, the present invention detects the initiation of a user session and, in response, the RNN enables or otherwise creates a plurality of layers. The session/user data is communicated to the first hidden layer and homomorphic encryption is implemented to encrypt the session/user data and a first session wrapper is created and maintained in the first hidden layer, which overlays the actual user session. Subsequently, the encrypted session/user data is communicated to the next layer (i.e., either a second hidden layer or the final layer) and the homomorphic encryption is implemented to further encrypt the encrypted session/user data and second session wrapper is created and maintained in the next layer. The process continues until all of the plurality of layers of session wrappers and encrypted session/user data. Since only the final layer is exposed to the website and/or domain, a bad actor/wrongdoer gaining access to the session wrapper in the final layer will only have access to the encrypted session/user data associated with the session wrapper.

In specific embodiments of the invention, once unauthorized use/tampering is detected within the session wrapper of the final layer, the RNN will be triggered to reconfigure the plurality of layers including adding additional hidden layers, with each hidden layer maintaining a separate session wrapper. Moreover, once unauthorized use/tampering is detected within the session wrapper of the final layer, the homomorphic encryption will be triggered (either in addition to or in lieu of the RNN reconfiguring the plurality of layers) to re-encrypt the session/user data in each of the session wrappers. In addition, the user, website-maintaining entity and/or domain-maintaining entity may be alerted of such unauthorized use/tampering, including notification of the user, website, domain, session identifier or the like. In other specific embodiments of the invention, addition security is realized by re-encrypting the session/user data in each of the session wrappers and/or reconfiguring the layers on a predetermined time basis.

A system for securing web browsing sessions defines first embodiments of the invention. The system includes a recurrent neural network configured to implement homomorphic encryption. The system additionally includes a computing platform including a memory and one or more computing processor devices in communication with the memory. The memory stores a web browsing session security sub-system that is executable by at least one of the one or more computing processor devices.

The web browser session security sub-system is configured to detect a web browser session initiated by a user and defining web browser session data. In response to detecting the web browser session, the sub-system is configured to implement the recurrent neural network (RNN) to enable (i) a hidden layer configured to maintain a hidden replicated web browser session wrapper, and (ii) a final layer configured to maintain a final replicated web browser session wrapper. In addition, the sub-system is configured to (i) communicate the web browsing session data to the hidden layer and implement the homomorphic encryption on the web browsing session data to create the hidden replicated web browser session wrapper including encrypted web browsing session data, and (ii) communicate the hidden replicated web browser session wrapper to the final layer and implement the homomorphic encryption on the encrypted web browsing session data to create the final replicated web browser session wrapper including final encrypted web browsing session data. As a result, the sub-system is configured to enable (i) the hidden replicated web browser session wrapper over the web browser session and (ii) the final replicated web browser session wrapper over the hidden replicated web browser session wrapper. As a resulting of the session wrapper, only the final replicated web browser session wrapper is exposed to websites during the web browser session.

In specific embodiments of the system, the web browsing session security sub-system is further configured to implement the recurrent neural network to enable a plurality of hidden layers, each hidden layer from amongst the plurality of hidden layers configured to maintain individual and corresponding hidden replicated web browser session wrappers. In related embodiments of the invention, the web browsing session security sub-system is further configured to determine how many hidden layers to include in the plurality of hidden layers. In such embodiments of the invention, the determination the determination of how many hidden layers to include in the plurality of hidden layers is based, at least, on previous web browser sessions initiated by the user and/or previous instances of unauthorized use at the website associated with the session or the network/domain at which the session is being conducted.

In other related embodiments of the invention, in which the (RNN) enables a plurality of hidden layers, the web browsing session security sub-system is further configured to (i) communicate the web browsing session data to a first hidden layer from amongst the plurality of hidden layers and implement the homomorphic encryption on the web browsing session data to create a first hidden replicated web browser session wrapper including first encrypted web browsing session data, (ii) communicate the first hidden replicated web browser session wrapper to a second hidden layer from amongst the plurality of hidden layers and implement the homomorphic encryption on the first encrypted web browsing session data to create a second hidden replicated web browser session wrapper including second encrypted web browsing session data, and (iii) communicate a last hidden replicated web browser session wrapper from a last layer from amongst the plurality of hidden layers to the final layer and implement the homomorphic encryption on last encrypted web browsing session data in the last hidden replicated web browser session wrapper to create the final replicated web browser session wrapper including the final encrypted web browsing session data. In such embodiments of the system, the web browsing session security sub-system is further configured enable (i) the first hidden replicated web browser session wrapper over the web browser session, (ii) the second hidden replicated web browser session wrapper over the first hidden replicated web browser session wrapper and (iii) the final replicated web browser session wrapper over the last hidden replicated web browser session wrapper.

In other specific embodiments of the system, the web browsing session security sub-system is further configured to analyze the web browser session to determine a portion of the web browser session data requiring subsequent homomorphic encryption, such, that only the portion of the web browser session data is communicated to the hidden layer.

In further embodiments of the system, the web browsing session security sub-system is further configured to detect unauthorized use within the final replicated web browser session wrapper. In related embodiments of the system, in response to detecting unauthorized use within the final replicated web browser session wrapper, the web browsing session security sub-system is further configured to implement the recurrent neural network to add one or more additional hidden layers, each additional hidden layer configured to maintain an individual and corresponding hidden replicated web browser session wrapper and/or implement the homomorphic encryption to change encryption on the encrypted web browsing session data and the final encrypted web browsing session data. In other related embodiments of the system, in response to detecting unauthorized use within the final replicated web browser session wrapper, the web browsing session security sub-system is further configured to generate and initiate communication of an alert that is configured to identify (i) the user, (ii) the website at which the unauthorized use has been detected, and/or (iii) an Internet Protocol (IP) address associated with the web browsing session.

In other specific embodiments of the system, the web browsing session security sub-system is further configured to, in response to expiration of a predefined time period, implement the homomorphic encryption to change encryption on the encrypted web browsing session data and the final encrypted web browsing session data.

A computer-implemented method for securing web-browser sessions defines second embodiments of the invention. The computer-implemented method is executable by one or more computing processor devices. The method includes detecting a web browser session initiated by a user and defining web browser session data and, in response to detecting the web browser session, implementing a recurrent neural network to enable (i) a hidden layer configured to maintain a hidden replicated web browser session wrapper, and (ii) a final layer configured to maintain a final replicated web browser session wrapper. The method further includes (i) communicating the web browsing session data to the hidden layer and implementing homomorphic encryption on the web browsing session data to create the hidden replicated web browser session wrapper including encrypted web browsing session data, and (ii) communicating the hidden replicated web browser session wrapper to the final layer and implement the homomorphic encryption on the encrypted web browsing session data to create the final replicated web browser session wrapper including final encrypted web browsing session data, Further, the method includes enabling (i) the hidden replicated web browser session wrapper over the web browser session and (ii) the final replicated web browser session wrapper over the hidden replicated web browser session wrapper. As a result, only the final replicated web browser session wrapper is exposed to websites during the web browser session.

In specific embodiments of the computer-implemented method, implementing the recurrent neural network further includes implementing the recurrent neural network to enable a plurality of hidden layers, each hidden layer from amongst the plurality of hidden layers configured to maintain individual and corresponding hidden replicated web browser session wrappers. In related embodiments the method further includes determining how many hidden layers to include in the plurality of hidden layers.

In further related embodiments of the method, communicating the web browser session data further includes communicating the web browsing session data to a first hidden layer from amongst the plurality of hidden layers and implementing the homomorphic encryption on the web browsing session data further includes implementing the homomorphic encryption on the web browsing session data to create a first hidden replicated web browser session wrapper including first encrypted web browsing session data. In such embodiments the method further includes communicating the first hidden replicated web browser session wrapper to a second hidden layer from amongst the plurality of hidden layers and implementing the homomorphic encryption on the first encrypted web browsing session data to create a second hidden replicated web browser session wrapper including second encrypted web browsing session data. In such embodiments of the method, communicating the hidden replicated web browser session wrapper further includes communicating a last hidden replicated web browser session wrapper from a last layer from amongst the plurality of hidden layers to the final layer and implementing the homomorphic encryption on last encrypted web browsing session data in the last hidden replicated web browser session wrapper to create the final replicated web browser session wrapper including the final encrypted web browsing session data. Moreover, in such embodiments of the method, enabling further includes enabling (i) the first hidden replicated web browser session wrapper over the web browser session, (ii) the second hidden replicated web browser session wrapper over the first hidden replicated web browser session wrapper and (iii) the final replicated web browser session wrapper over the last hidden replicated web browser session wrapper.

In further specific embodiments the computer-implemented method includes detecting unauthorized use within the final replicated web browser session wrapper, and, in response to detecting the unauthorized use within the final replicated web browser session wrapper, (i) implementing the recurrent neural network to add one or more additional hidden layers, each additional hidden layer configured to maintain an individual and corresponding hidden replicated web browser session wrapper, and (ii) implementing the homomorphic encryption to change encryption on the encrypted web browsing session data and the final encrypted web browsing session data.

A computer program product including a non-transitory computer-readable medium defines third embodiments of the invention. The non-transitory computer-readable medium includes a first set of codes for causing a computing device to detect a web browser session initiated by a user and defining web browser session data, and a second set of codes for causing a computing device to, in response to detecting the web browser session, implement a recurrent neural network to enable (i) a hidden layer configured to maintain a hidden replicated web browser session wrapper, and (ii) a final layer configured to maintain a final replicated web browser session wrapper. In addition, the computer-readable medium includes a third set of codes for causing a computing device to communicate the web browsing session data to the hidden layer and implement homomorphic encryption on the web browsing session data to create the hidden replicated web browser session wrapper including encrypted web browsing session data. Additionally, the computer-readable medium includes a fourth set of codes for causing a computing device to communicate the hidden replicated web browser session wrapper to the final layer and implement the homomorphic encryption on the encrypted web browsing session data to create the final replicated web browser session wrapper including final encrypted web browsing session data. Moreover, the computer-readable medium includes a fifth set of codes for causing a computing device to enable (i) the hidden replicated web browser session wrapper over the web browser session and (ii) the final replicated web browser session wrapper over the hidden replicated web browser session wrapper. As a result, only the final replicated web browser session wrapper is exposed to websites during the web browser session.

In specific embodiments of the computer program product, the second set of codes is further configured to cause the computing device to implement the recurrent neural network to enable a plurality of hidden layers, each hidden layer from amongst the plurality of hidden layers configured to maintain individual and corresponding hidden replicated web browser session wrappers. In related embodiments of the computer program product, the third set of codes are further configured to cause the computing to communicate the web browsing session data to a first hidden layer from amongst the plurality of hidden layers and implement the homomorphic encryption on the web browsing session data to create a first hidden replicated web browser session wrapper including first encrypted web browsing session data. In such embodiments of the computer program product, the non-transitory computer-readable medium further includes a sixth set of codes for causing a computing device to communicate the first hidden replicated web browser session wrapper to a second hidden layer from amongst the plurality of hidden layers and implement the homomorphic encryption on the first encrypted web browsing session data to create a second hidden replicated web browser session wrapper including second encrypted web browsing session data. Moreover, in such embodiments of the computer program product, the fourth set of codes are further configured to cause the computing device to communicate a last hidden replicated web browser session wrapper from a last layer from amongst the plurality of hidden layers to the final layer and implement the homomorphic encryption on last encrypted web browsing session data in the last hidden replicated web browser session wrapper to create the final replicated web browser session wrapper including the final encrypted web browsing session data, and the fifth set of codes are further configured to cause the computing device to enable (i) the first hidden replicated web browser session wrapper over the web browser session, (ii) the second hidden replicated web browser session wrapper over the first hidden replicated web browser session wrapper and (iii) the final replicated web browser session wrapper over the last hidden replicated web browser session wrapper.

In other related embodiments of the computer program product, the non-transitory computer-readable medium further includes a sixth set of codes for causing a computing device to detect unauthorized use within the final replicated web browser session wrapper, and a seventh set of codes for causing a computing device to, in response to detecting the unauthorized use within the final replicated web browser session wrapper, (i) implement the recurrent neural network to add one or more additional hidden layers, each additional hidden layer configured to maintain an individual and corresponding hidden replicated web browser session wrapper, and (ii) implement the homomorphic encryption to change encryption on the encrypted web browsing session data and the final encrypted web browsing session data.

Thus, according to embodiments of the invention, which will be discussed in greater detail below, the present invention addresses needs and/or achieves other advantages by providing for a recurrent neural network (RNN) capable of creating a plurality of layers comprising web browser session wrappers, which overlay the actual user session. In this regard, the RNN creates hidden layer(s) and a final layer overlaying the last hidden layer which is exposed to the website and or domain. The RNN implements homomorphic encryption to systematically encrypt the session data and/or user data associated with the actual user session and stored or accessible to the various session wrappers. Once unauthorized use/tampering is detecting in the final layer, the RNN can reconfigure/add to the existing hidden layers and/or the homomorphic encryption can re-encrypt the session/user data is each layer/session wrapper.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
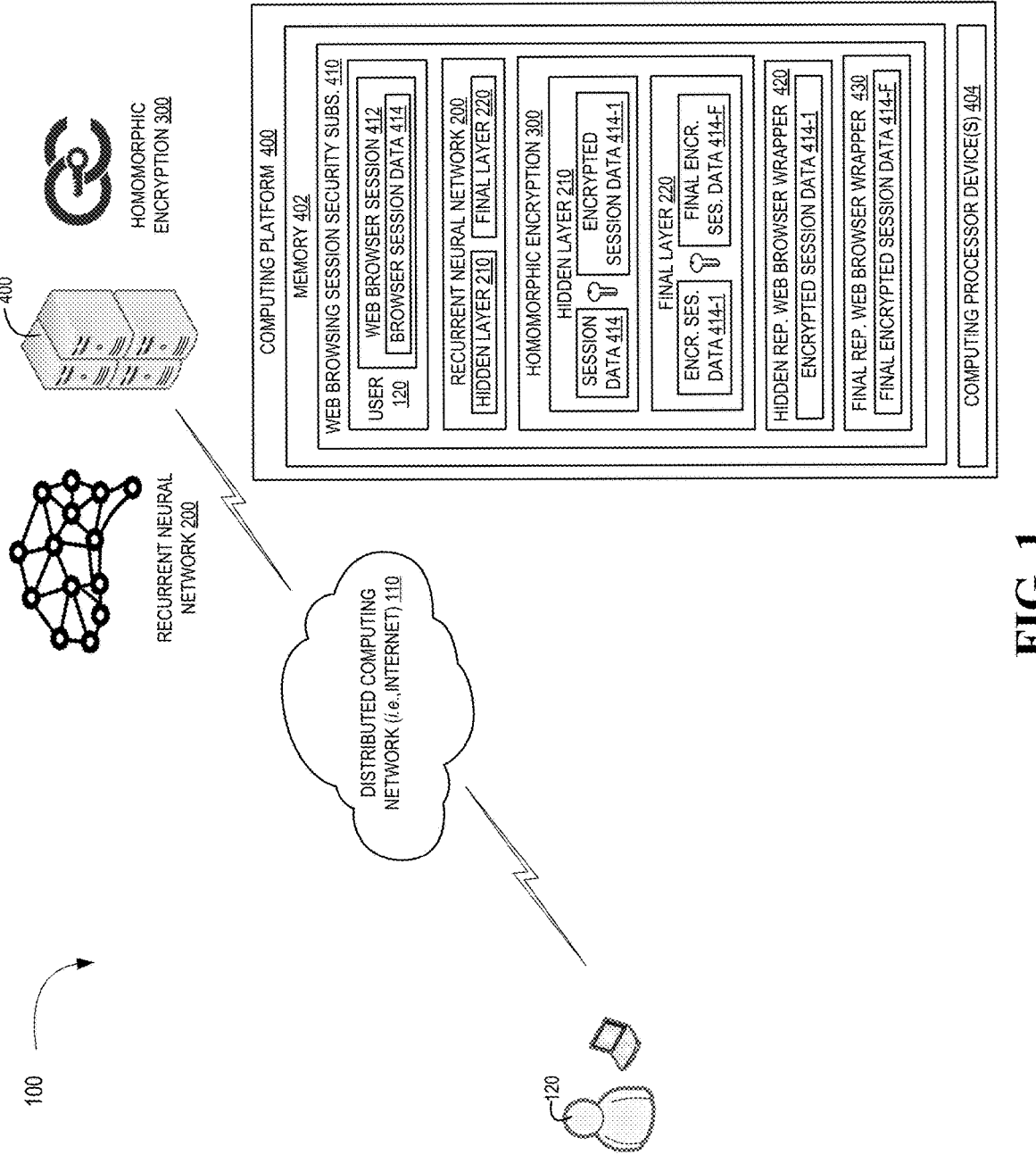
Figure 3:
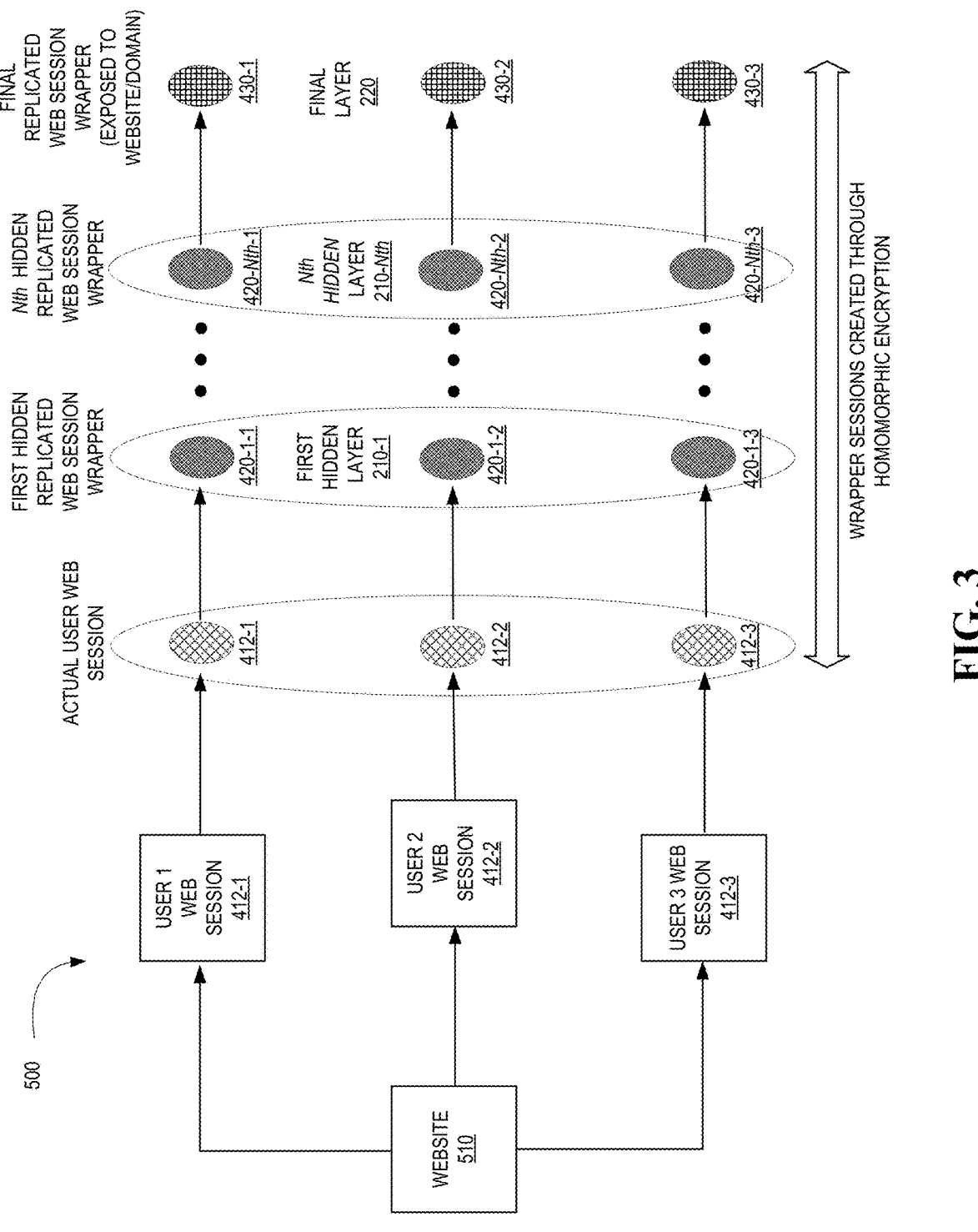
Figure 4:
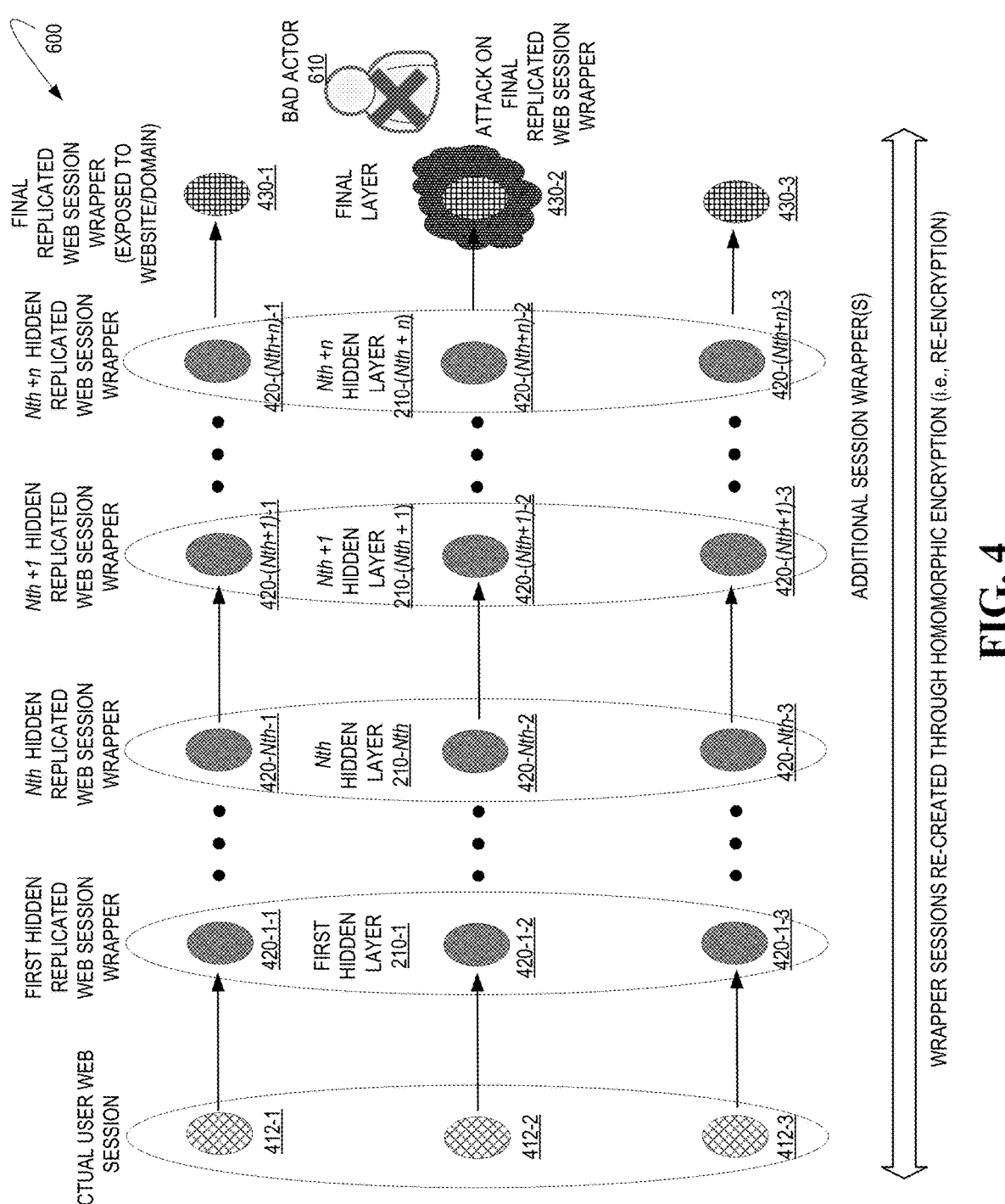
Figure 5:
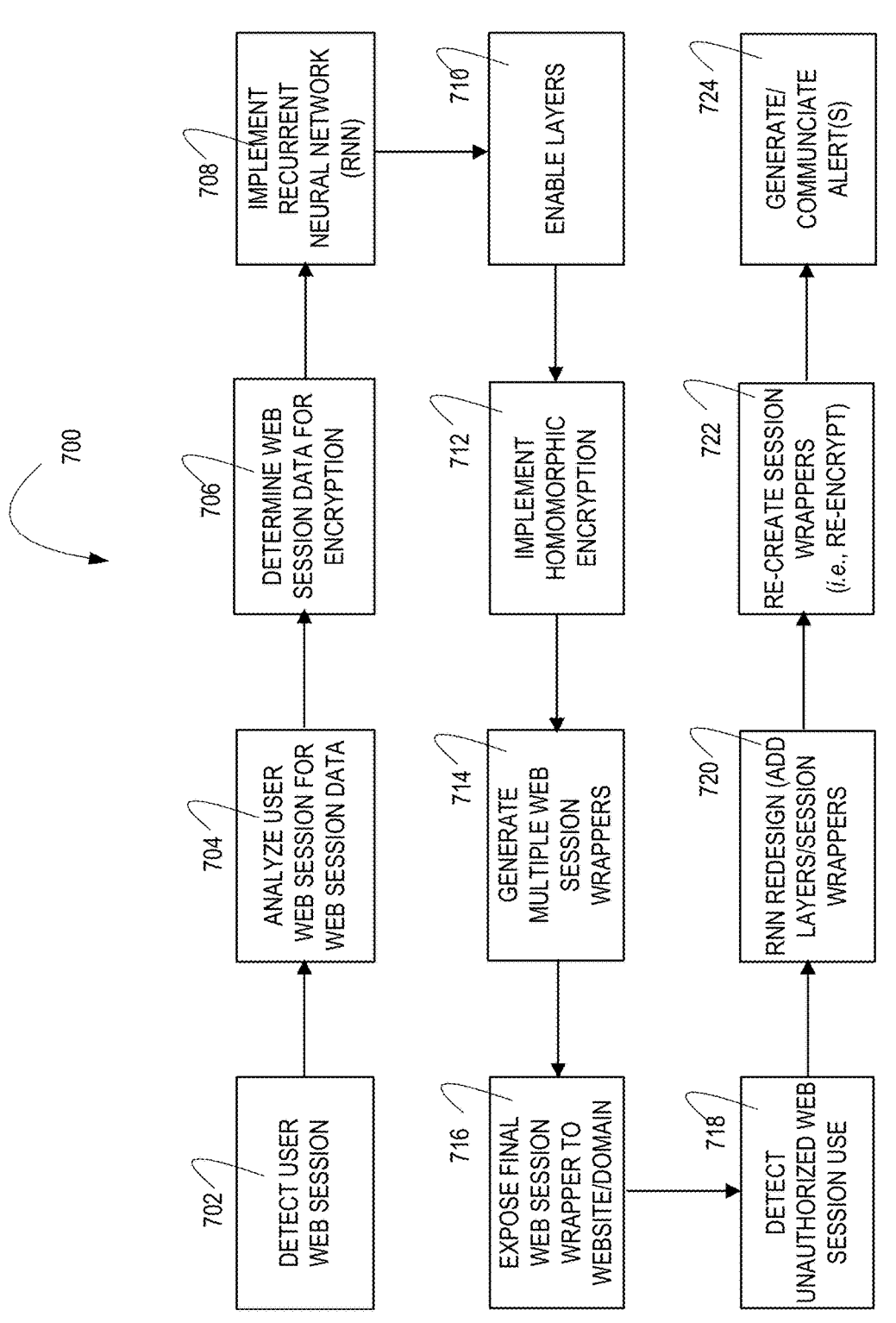

Having thus described embodiments of the disclosure in general terms, reference will now be made to the accompanying drawings, wherein:

FIG. 1 is a schematic/block diagram of a system for web browsing session security, in accordance with embodiments of the present invention;

FIG. 2 is a block diagram of a computing system storing a web browsing session security sub-system, in accordance with alternate embodiments of the present invention;

FIG. 3 is a schematic diagram of a system for web browsing session security, in accordance with embodiments of the present invention;

FIG. 4 is a schematic diagram of a system for web browsing session security highlighting actions taken in response to unauthorized use, in accordance with embodiments of the invention;

FIG. 5 is a flow diagram of a method for web browsing session security, in accordance with embodiments of the present invention; and FIG. 6 is a flow diagram of a method for web browsing session security, in accordance with alternate embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, a.), or an embodiment combining software and hardware aspects that may be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for a recurrent neural network (RNN) capable of creating a plurality of layers comprising web browser session wrappers, which overlay the actual user session. In this regard, the RNN creates at least one, and typically more, hidden layer(s) and a so-called final layer overlaying the last hidden layer which is exposed to the website and or domain. Moreover, the RNN implements homomorphic encryption to systematically encrypt the session data and/or user data associated with the actual user session.

Specifically, the present invention detects the initiation of a user session and, in response, the RNN enables or otherwise creates a plurality of layers. The session/user data is communicated to the first hidden layer and homomorphic encryption is implemented to encrypt the session/user data and a first session wrapper is created and maintained in the first hidden layer, which overlays the actual user session. Subsequently, the encrypted session/user data is communicated to the next layer (i.e., either a second hidden layer or the final layer) and the homomorphic encryption is implemented to further encrypt the encrypted session/user data and second session wrapper is created and maintained in the next layer. The process continues until all of the plurality of layers of session wrappers and encrypted session/user data. Since only the final layer is exposed to the website and/or domain, a bad actor/wrongdoer gaining access to the session wrapper in the final layer will only have access to the encrypted session/user data associated with the session wrapper.

In specific embodiments of the invention, once unauthorized use/tampering is detected within the session wrapper of the final layer, the RNN will be triggered to reconfigure the plurality of layers including adding additional hidden layers, with each hidden layer maintaining a separate session wrapper. Moreover, once unauthorized use/tampering is detected within the session wrapper of the final layer, the homomorphic encryption will be triggered (either in addition to or in lieu of the RNN reconfiguring the plurality of layers) to re-encrypt the session/user data in each of the session wrappers. In addition, the user, website-maintaining entity and/or domain-maintaining entity may be alerted of such unauthorized use/tampering, including notification of the user, website, domain, session identifier or the like. In other specific embodiments of the invention, addition security is realized by re-encrypting the session/user data in each of the session wrappers and/or reconfiguring the layers on a predetermined time basis.

Referring to FIG. 1, a schematic/block diagram is presented of an exemplary system 100 for web browsing session security, in accordance with embodiments of the present invention. The system 100 is implemented across a distributed communication network 110, such as the Intranet or the like. As depicted, the system 100 includes at least one recurrent neural network (RNN) 200 and a homomorphic encryption 300 mechanism, which may be implemented in conjunction with the RNN 200.

System 100 additionally includes a computing platform 400, which may comprise one or more servers or the like. The computing platform includes a memory 402 and one or more computing processor devices 404 in communication with memory 402. Memory 402 stores web browsing session security sub-system 410 that is executable by at least one of the one or more computing processor devices 404.

Web browsing session security sub-system 410 is configured to detect a web browser session 412 initiated by a user 120 and defining web browser session data 414, such as session identifier (ID), user identifier (ID) and the like. In response to detection of the initiation web browser session 412, web browsing session security sub-system 410 is configured to implement the RNN 200 to enable (i) a hidden layer 210, which is configured to maintain a hidden replicated web browser session wrapper 420 and (ii) a final layer 220, which is configured to maintain a final replicated web browser session wrapper 430. The term "final," in this instance, refers to the last layer/session wrapper in a series of layers/session wrappers. A wrapper or software wrapper is a programming construct used to encapsulate or wrap existing functionality or code in a layer that provides a different interface or behavior. This wrapping allows the functionality to be used in a different context or environment without modifying the original code.

Further, web browsing session security sub-system 410 is configured to communicate the web browser session data 414 or a portion thereof to the hidden layer 210 and implement the homomorphic encryption 300 on the web browser session data 414 or a portion thereof to create the hidden replicated web browser session wrapper 420 including encrypted web browser session data 414-1. In response, web browsing session security sub-system 410 is configured to communicate the encrypted web browser session data 414-1 to the final layer 220 and implement the homomorphic encryption 300 on the encrypted web browser session data 414-1 to create the final replicated web browser session wrapper 430 including final encrypted web browser session data 414-F.

In response, web browsing session security sub-system 410 is configured to enable the hidden replicated web browser session wrapper 420 over the web browser session 412 (i.e., actual user web browser session) and the final replicated web browser session wrapper 430 over the hidden replicated web browser wrapper 420. As a result, only the final replicated web browser wrapper 430 (and the corresponding final encrypted session data 414-F) is exposed to the website and domain associated with the actual web browsing session 412. This means that a bad actor/wrongdoer would only be able to access the final replicated web browser wrapper and the corresponding final encrypted session data 414-F and otherwise have no ability to gain access to the hidden layer 210/web browser wrapper 420 and, more importantly, the actual user's web browser session 412.

Referring to FIG. 2, a block diagram is depicted of computing platform 400 including web browsing session security sub-system 410, in accordance with embodiments of the present invention. In addition to providing greater detail, FIG. 2 highlights various alternate embodiments of the web browsing session security sub-system 410. Computing platform 400 comprises one or more computing devices, such as servers or the like, configured to execute software programs, including sub-systems, instructions, engines, algorithms, modules, routines, applications, tools, and the like. As previously discussed, edge computing platform 400 includes memory 402, which may comprise volatile and non-volatile memory, such as read-only memory (ROM) and/or random-access memory (RAM), EPROM, EEPROM, flash cards, or any memory common to computer platforms. Moreover, memory 402 may comprise cloud storage, such as provided by a cloud storage service and/or a cloud connection service.

Further, computing platform 400 also includes computing processor device(s) 404, which may be an application-specific integrated circuit ("ASIC"), or other chipset, logic circuit, or other data processor device. Computing processor device 404 may execute an application programming interface ("API") 406 that interfaces with any resident programs, such as web browsing session security sub-system 410 and algorithms, sub-engines/routines associated therewith or the like stored in the memory 402 of the computing platform 400.

Computing processor device(s) 404 may include various processing subsystems (not shown in FIG. 2) embodied in hardware, firmware, software, and combinations thereof, that enable the functionality of computing platform 400 and the operability of computing platform 400 on a distributed communication network 110 (shown in FIG. 1). For example, processing subsystems allow for initiating and maintaining communications and exchanging data with other networked devices, such as the computing device of user 120 (shown in FIG. 1). For the disclosed embodiments of the invention, processing subsystems of computing processor device 404 may include any subsystem used in conjunction with web browsing session security sub-system 410 and related engines, routines, algorithms, sub-algorithms, modules, sub-modules thereof.

Computing platform 400 additionally includes a communications module (not shown in FIG. 2) embodied in hardware, firmware, software, and combinations thereof, that enables electronic communications between computing platform 400 and other networks and/or networked devices. Thus, the communication module may include the requisite hardware, firmware, software and/or combinations thereof for establishing and maintaining a network communication connection with one or more systems, platforms, networks, or the like.

As previously discussed in relation to FIG. 1, memory 402 of computing platform 400 stores web browsing session security sub-system 410 that is executable by the computing processor device(s) 404. Web browsing session security sub-system 410 is configured to detect a web browser session 412 initiated by a user 120 and defining web browser session data 414, such as session identifier (ID), user identifier (ID) and the like. In specific embodiments of the system 100, web browsing session security sub-system 410 is further configured to analyze the web browser session data 414 to determine the portion of the web browser session requiring encryption 414-0. In this regard, the analyzation/determination of which portion of the web browser session requires encryption 414-0 make take into the account the type of website and/or domain (i.e., secured vs. unsecured) at which the web browser session 412 is occurring and/or previous security infractions at the website/domain or associated with previous user web browser sessions.

In specific embodiments of the invention, in which multiple hidden layers 210 and corresponding web browser wrappers 420 may be implemented, RNN 200 is further configured to determine 440 the hidden layer volume 442 (i.e., the number of hidden layers 210) based at least on historical user session data 444 (e.g., previous instances of unauthorized web browser session use) and/or the type of website and/or domain (i.e., secured vs. unsecured) at which the web browser session 412 is occurring and/or previous security infractions at the website/domain.

In response to detection of the initiation web browser session 412, web browsing session security sub-system 410 is configured to implement the RNN 200 to enable (i) one or more hidden layers 210, which are configured to maintain a corresponding hidden replicated web browser session wrapper 420 and (ii) a final layer 220, which is configured to maintain a final replicated web browser session wrapper 430.

Further, web browsing session security sub-system 410 is configured to communicate the web browser session data 414 or, in specific embodiments the determined web browser session data requiring encryption 414-0 to the first hidden layer 210-1 and implement the homomorphic encryption 300 on the web browser session data 414 or 414-0 to create the first hidden replicated web browser session wrapper 420-1 including first encrypted web browser session data 414-1. Subsequently, the first encrypted web browser session data 414-1 to the second hidden layer (not shown in FIG. 2) and implement the homomorphic encryption 300 on the first encrypted web browser session data 414-1 to create the second hidden replicated web browser session wrapper including second encrypted web browser session data. This process continues and is consummated by the second from last (i.e., Nth−1) hidden encrypted web browser session data 414-(Nth−1) is communicated to the last (i.e., Nth) hidden layer 210-Nth and the homomorphic encryption 300 is implemented on the last (i.e., Nth−1) hidden encrypted web browser session data 414-(Nth−1) to create the Nth hidden replicated web browser session wrapper 420-Nth including Nth encrypted web browser session data 414-Nth. Lastly, web browsing session security sub-system 410 is configured to communicate the Nth encrypted web browser session data 414-Nth to the final layer 220 and implement the homomorphic encryption 300 on the Nth encrypted web browser session data 414-Nth to create the final replicated web browser session wrapper 430 including final encrypted web browser session data 414-F.

In response, web browsing session security sub-system 410 is configured to enable the first hidden replicated web browser session wrapper 420-1 over the web browser session 412, the second hidden replicated web browser session wrapper (not shown in FIG. 2) over the first hidden replicated web browser session wrapper 420-1 and so on, until the last (i.e., Nth) hidden replicated web browser session wrapper 420-Nth is enabled over the second from last (i.e., Nth−1) hidden replicated web browser session wrapper 420-(Nth−1). Subsequently, the final replicated web browser session wrapper 430 is enabled over the last (i.e., Nth) hidden replicated web browser session wrapper 420-Nth. As a result, only the final replicated web browser wrapper 430 (and the corresponding final encrypted web browser session data 414-F) is exposed to the website and domain associated with the actual web browsing session 412.

In additional specific embodiments, web browsing session security sub-system 410 is configured for unauthorized web session use detection 470, which is configured to detect a wrongdoer/bad actor gaining access to the final replicated web browser wrapper 430 and tampering with (e.g., trying to decrypt or otherwise capture) the final encrypted session data 414-F. In response to for unauthorized web session use detection 470, web browsing session security sub-system 410 is configured to implement RNN 200 to reconstruct hidden layers 210 (i.e., add additional layers and/or rearrange existing layers) and/or implement the homomorphic encryption 300 to re-encrypt 472 the encrypt web browser session data 414-1 . . . 414-Nth and F in the hidden layers 210 and final layer 220 and/or generate and initiate communication of alerts 474 to the entity in control on the website and/or domain informing the entity or entities of the unauthorized use including the session ID, user ID, website and domain as deduced from decryption of the encrypt web browser session data 414-1 . . . 414-Nth and F back to the actual web browser session data 414.

In other specific embodiments of the system 100, web browsing session security sub-system 410 is configured to implement the homomorphic encryption 300 to re-encrypt 492 the encrypt web browser session data 414-1 . . . 414-Nth and F in the hidden layers 210 and final layer 220 as response a predetermined time period 490 (e.g., once every 10 second, one minute or the like) or dynamically determined time period (not shown in FIG. 2) e.g., adjusted time period after detection of unauthorized use or the like.

Referring to FIG. 3, a schematic diagram is depicted of a system 500 for web browser session security, in accordance with embodiments of the invention. Website 510 has three different web sessions 412-1, 412-2, and 412-3 active amongst three separate users (user 1, user 2 and user 3). Each user web session 412-1, 412-2 and 412-3 has multiple hidden layers 210 and a final layer 220. The number of hidden layers 210 may be the same for each user web session 412 or may vary amongst the different the user web sessions 412. Each hidden layer maintains a hidden replicated web session wrapper 420 for each user web session 412, which is hidden from exposure by the website and domain. For example, first hidden layer 210-1 maintains first hidden replicated web session wrapper 420-1-1, 420-1-2, and 420-1-3 over corresponding user web sessions 412-1, 412-2 and 412-3 and Nth hidden layer 210-Nth maintains Nth hidden replicated web session wrapper 420-Nth–1, 420-Nth–2, and 420-Nth–3 over a corresponding previous (Nth–1) hidden replicated web session wrapper (not shown in FIG. 3). The final layer 220, which is exposed in the website and domain, maintains a final hidden replicated web session wrapper 430-1, 430-2, and 430-3 for each user web session 412-1, 412-2 and 412-3. Moreover, as previous discussed in relation to FIGS. 1 and 2, the web session wrappers are created through homomorphic encryption during which the web session data or a portion thereof is encrypted homomorphically across the various layers 210 and 220.

Referring to FIG. 4, a schematic diagram is depicted of a system 500 for web browser session security, in which unauthorized use has occurred at the final replicated web session wrapper, in accordance with embodiments of the present invention. In response to detecting unauthorized use by a wrongdoer/bad actor 610 within one of the final replicated web session wrappers, e.g., 430-2, the system 500 is configured to implement the RNN 300 (shown in FIG. 1) to reconstruct hidden layers 210 (i.e., add additional layers and corresponding hidden replicated web session wrappers). For example, as shown in FIG. 4, Nth+1 up Nth+n hidden layers 210-(Nth+1) and 210-(Nth+n) have been added with each added layer having corresponding hidden replicated web session wrappers 420-(Nth+1) and 420-(Nth+n) for each user web session. While the illustrated embodiments shows added hidden layers and corresponding web session wrappers for each user web session, it is possible to configure the system such that only the user session experiencing the unauthorized use undergoes hidden layer reconstruction (i.e., adding additional layers and/or rearranging existing layers). In specific embodiments of the system 600, in addition to reconstructing hidden layers 210, detection of unauthorized use results in re-creating web browser wrappers through homomorphic encryption (i.e., re-encrypting the web session data).

Referring to FIG. 5 a high-level flow diagram is depicted of a method 700 for web browsing session security, in accordance with embodiments of the present invention. At Event 702, initiation of user web session is detected and, at Event 704, the web session is analyzed for web session data (e.g., web session ID, user ID and the like). In specific embodiments of the method 700, at Event 706, a determination is made as to which portion of the web session data requires encryption. For example, more web session data may require encryption based on the type of website/domain and or historical data related to previous unauthorized use cases at the website/domain or the like.

At Event 708, a recurrent neural network (RNN) is implemented and, at Event 710, hidden layer(s) and a final layer are enabled. In specific embodiments of the method 700 (not shown in FIG. 5), the number/volume of hidden layers may be determined based on the type of website/domain and or historical data related to previous unauthorized use cases at the website/domain or the like. At Event 712, homomorphic encryption is implemented to encrypt the web session data for each hidden layer and the final layer and, at Event 714 the multiple web session wrappers are generated, one web session wrapper for each layer.

At Event 716, the final web session wrapper is exposed at the website/domain at which the web session is occurring and, at Event 718, unauthorized use by a wrongdoer/bad actor is detected at the final web session wrapper. In response to detection of the unauthorized use/tampering at the final web session wrapper, at Event 720, the recurrent neural network is redesigned, which may include adding additional hidden layers and corresponding web session wrappers and/or rearranging existing layers. At Event 722, homomorphic encryption is implemented to re-create the web session wrappers (i.e., re-encrypt the web session data at each existing and added layer). At Event 724, an alert is generated and communication is initiated to an entity or entities in control of the website, domain or the like. In formation in the alert may include, but is not limited to, session ID, user ID, website, domain, which may be deduced from systematically decrypted the encrypted web session data from the final web session wrapper all the back through the hidden replicated web session wrapper(s) in the hidden layer(s).

Referring to FIG. 6, a flow diagram is presented of a method 800 for web session security, in accordance with embodiments of the present invention. At Event 810, initiation of a user's web browser session is detected. The web browser session defining web browser session data, such as session ID, user ID and the like. In response to detecting the web browser session, at Event 820, a recurrent neural network is implementing to enable (i) a hidden layer configured to maintain a hidden replicated web browser session wrapper, and (ii) a final layer configured to maintain a final replicated web browser session wrapper.

At Event 830, the web browsing session data is communicated to the hidden layer and homomorphic encryption is implementing on the web browsing session data to create the hidden replicated web browser session wrapper including encrypted web browsing session data. In addition, at Event 840, the hidden replicated web browser session wrapper is communicated to the final layer and the homomorphic encryption is implemented on the encrypted web browsing session data to create the final replicated web browser session wrapper including final encrypted web browsing session data.

At Event 850, (i) the hidden replicated web browser session wrapper is enabled over the web browser session and (ii) the final replicated web browser session wrapper is enabled over the hidden replicated web browser session wrapper. As result of the configuration of the web browser session wrappers, only the final replicated web browser session wrapper is exposed to websites and domains during the web browser session.

Thus, as described in detail above, present embodiments of the invention include systems, methods, computer program products and/or the like for a recurrent neural network (RNN) capable of creating a plurality of layers comprising web browser session wrappers, which overlay the actual user session. In this regard, the RNN creates hidden layer(s) and a final layer overlaying the last hidden layer which is exposed to the website and or domain. The RNN implements homomorphic encryption to systematically encrypt the session data and/or user data associated with the actual user session and stored or accessible to the various session wrappers. Once unauthorized use/tampering is detecting in the final layer, the RNN can reconfigure/add to the existing hidden layers and/or the homomorphic encryption can re-encrypt the session/user data is each layer/session wrapper.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for securing web browsing sessions, the system comprising:
   a recurrent neural network configured to implement homomorphic encryption; and
   a computing platform including a memory, and one or more computing processor devices in communication with the memory, wherein the memory stores a web browsing session security sub-system, executable by at least one of the one or more computing processor devices and configured to:
   detect a web browser session initiated by a user and defining web browser session data;
   implement the recurrent neural network to:
      enable (i) a hidden layer configured to maintain a hidden replicated web browser session wrapper, and (ii) a final layer configured to maintain a final replicated web browser session wrapper,
      communicate the web browsing session data to the hidden layer and implement the homomorphic encryption on the web browsing session data to create the hidden replicated web browser session wrapper including encrypted web browsing session data,
      communicate the hidden replicated web browser session wrapper to the final layer and implement the homomorphic encryption on the encrypted web browsing session data to create the final replicated web browser session wrapper including final encrypted web browsing session data, and
      enable the hidden replicated web browser session wrapper over the web browser session and the final replicated web browser session wrapper over the hidden replicated web browser session wrapper, wherein only the final replicated web browser session wrapper is exposed to websites during the web browser session.

2. The system of claim 1, wherein the web browsing session security sub-system is further configured to implement the recurrent neural network to enable a plurality of hidden layers, each hidden layer from amongst the plurality of hidden layers configured to maintain individual and corresponding hidden replicated web browser session wrappers.

3. The system of claim 2, wherein the web browsing session security sub-system is further configured to determine how many hidden layers to include in the plurality of hidden layers.

4. The system of claim 3, wherein the web browsing session security sub-system is further configured to implement the recurrent neural network to determine how many hidden layers to include in the plurality of hidden layers, wherein the determination of how many hidden layers to include in the plurality of hidden layers is based, at least, on previous web browser sessions initiated by the user.

5. The system of claim 2, wherein the web browsing session security sub-system is further configured to implement the recurrent neural network to:
   communicate the web browsing session data to a first hidden layer from amongst the plurality of hidden layers and implement the homomorphic encryption on the web browsing session data to create a first hidden replicated web browser session wrapper including first encrypted web browsing session data,
   communicate the first hidden replicated web browser session wrapper to a second hidden layer from amongst the plurality of hidden layers and implement the homomorphic encryption on the first encrypted web browsing session data to create a second hidden replicated web browser session wrapper including second encrypted web browsing session data,
   communicate a last hidden replicated web browser session wrapper from a last layer from amongst the plurality of hidden layers to the final layer and implement the homomorphic encryption on last encrypted web browsing session data in the last hidden replicated web browser session wrapper to create the final replicated web browser session wrapper including the final encrypted web browsing session data, and
   enable the first hidden replicated web browser session wrapper over the web browser session, the second hidden replicated web browser session wrapper over the first hidden replicated web browser session wrapper and the final replicated web browser session wrapper over the last hidden replicated web browser session wrapper.

6. The system of claim 1, wherein the web browsing session security sub-system is further configured to analyze the web browser session data to determine a portion of the web browser session data requiring subsequent encryption.

7. The system of claim 1, wherein the web browsing session security sub-system is further configured to detect unauthorized use within the final replicated web browser session wrapper.

8. The system of claim 7, wherein the web browsing session security sub-system is further configured to, in response to detecting unauthorized use within the final replicated web browser session wrapper, implement the recurrent neural network to add one or more additional hidden layers, each additional hidden layer configured to maintain an individual and corresponding hidden replicated web browser session wrapper.

9. The system of claim 7, wherein the web browsing session security sub-system is further configured to, in response to detecting unauthorized use within the final replicated web browser session wrapper, implement the homomorphic encryption to change encryption on the encrypted web browsing session data and the final encrypted web browsing session data.

10. The system of claim 7, wherein the web browsing session security sub-system is further configured to, in response to detecting unauthorized use within the final replicated web browser session wrapper, generate and initiate communication of an alert, wherein the alert is configured to identify (i) the user, (ii) a website at which the unauthorized use has been detected, and (iii) an Internet Protocol (IP) address associated with the web browsing session.

11. The system of claim 1, wherein the web browsing session security sub-system is further configured to, in response to expiration of a predefined time period, implement the homomorphic encryption to change encryption on the encrypted web browsing session data and the final encrypted web browsing session data.

12. A computer-implemented method for securing web-browser sessions, the computer-implemented method is executable by one or more computing processor devices, the method comprising:

detecting a web browser session initiated by a user and defining web browser session data;

in response to detecting the web browser session, implementing a recurrent neural network to enable (i) a hidden layer configured to maintain a hidden replicated web browser session wrapper, and (ii) a final layer configured to maintain a final replicated web browser session wrapper;

communicating the web browsing session data to the hidden layer and implementing homomorphic encryption on the web browsing session data to create the hidden replicated web browser session wrapper including encrypted web browsing session data;

communicating the hidden replicated web browser session wrapper to the final layer and implement the homomorphic encryption on the encrypted web browsing session data to create the final replicated web browser session wrapper including final encrypted web browsing session data; and enabling (i) the hidden replicated web browser session wrapper over the web browser session and (ii) the final replicated web browser session wrapper over the hidden replicated web browser session wrapper, wherein only the final replicated web browser session wrapper is exposed to websites during the web browser session.

13. The computer-implemented method of claim 12, wherein implementing the recurrent neural network further comprises implementing the recurrent neural network to enable a plurality of hidden layers, each hidden layer from amongst the plurality of hidden layers configured to maintain individual and corresponding hidden replicated web browser session wrappers.

14. The computer-implemented method of claim 13, further comprising:

determining how many hidden layers to include in the plurality of hidden layers.

15. The computer-implemented method of claim 13, wherein communicating the web browser session data further comprises communicating the web browsing session data to a first hidden layer from amongst the plurality of hidden layers and implementing the homomorphic encryption on the web browsing session data further comprises implementing the homomorphic encryption on the web browsing session data to create a first hidden replicated web browser session wrapper including first encrypted web browsing session data, wherein the computer-implemented method further comprises:

communicating the first hidden replicated web browser session wrapper to a second hidden layer from amongst the plurality of hidden layers and implementing the homomorphic encryption on the first encrypted web browsing session data to create a second hidden replicated web browser session wrapper including second encrypted web browsing session data, wherein communicating the hidden replicated web browser session wrapper further comprises communicating a last hidden replicated web browser session wrapper from a last layer from amongst the plurality of hidden layers to the final layer and implementing the homomorphic encryption on last encrypted web browsing session data in the last hidden replicated web browser session wrapper to create the final replicated web browser session wrapper including the final encrypted web browsing session data, and wherein enabling further comprises enabling (i) the first hidden replicated web browser session wrapper over the web browser session, (ii) the second hidden replicated web browser session wrapper over the first hidden replicated web browser session wrapper and (iii) the final replicated web browser session wrapper over the last hidden replicated web browser session wrapper.

16. The computer-implemented method of claim 12, further comprising:

detecting unauthorized use within the final replicated web browser session wrapper; and in response to detecting the unauthorized use within the final replicated web browser session wrapper, (i) implementing the recurrent neural network to add one or more additional hidden layers, each additional hidden layer configured to maintain an individual and corresponding hidden replicated web browser session wrapper, and (ii) implementing the homomorphic encryption to change encryption on the encrypted web browsing session data and the final encrypted web browsing session data.

17. A computer program product including a non-transitory computer-readable medium, the non-transitory computer-readable medium comprising code, which when executed, causes a computing device to:

detect a web browser session initiated by a user and defining web browser session data;

in response to detecting the web browser session, implement a recurrent neural network to enable (i) a hidden layer configured to maintain a hidden replicated web browser session wrapper, and (ii) a final layer configured to maintain a final replicated web browser session wrapper;

communicate the web browsing session data to the hidden layer and implement homomorphic encryption on the web browsing session data to create the hidden replicated web browser session wrapper including encrypted web browsing session data;

communicate the hidden replicated web browser session wrapper to the final layer and implement the homomorphic encryption on the encrypted web browsing session data to create the final replicated web browser session wrapper including final encrypted web browsing session data; and enable (i) the hidden replicated web browser session wrapper over the web browser session and (ii) the final replicated web browser session wrapper over the hidden replicated web browser session wrapper, wherein only the final replicated web browser session wrapper is exposed to websites during the web browser session.

18. The computer program product of claim 17, wherein the code, when executed, further causes the computing device to implement the recurrent neural network to enable a plurality of hidden layers, each hidden layer from amongst the plurality of hidden layers configured to maintain individual and corresponding hidden replicated web browser session wrappers.

19. The computer program product of claim 18, wherein the code, when executed, further causes the computing device to communicate the web browsing session data to a first hidden layer from amongst the plurality of hidden layers and implement the homomorphic encryption on the web browsing session data to create a first hidden replicated web browser session wrapper including first encrypted web browsing session data, wherein the code, when executed, further causes the computing device to:

communicate the first hidden replicated web browser session wrapper to a second hidden layer from amongst the plurality of hidden layers and implement the homomorphic encryption on the first encrypted web browsing session data to create a second hidden replicated web browser session wrapper including second encrypted web browsing session data, communicate a last hidden replicated web browser session wrapper from a last layer from amongst the plurality of hidden layers to the final layer and implement the homomorphic encryption on last encrypted web browsing session data in the last hidden replicated web browser session wrapper to create the final replicated web browser session wrapper including the final encrypted web browsing session data, and enable (i) the first hidden replicated web browser session wrapper over the web browser session, (ii) the second hidden replicated web browser session wrapper over the first hidden replicated web browser session wrapper and (iii) the final replicated web browser session wrapper over the last hidden replicated web browser session wrapper.

20. The computer program product of claim 19, wherein the code, when executed, further causes the computing device to:

detect unauthorized use within the final replicated web browser session wrapper; and in response to detecting the unauthorized use within the final replicated web browser session wrapper, (i) implement the recurrent neural network to add one or more additional hidden layers, each additional hidden layer configured to maintain an individual and corresponding hidden replicated web browser session wrapper, and (ii) implement the homomorphic encryption to change encryption on the encrypted web browsing session data and the final encrypted web browsing session data.

* * * * *